(12) United States Patent
Kelleher et al.

(10) Patent No.: US 9,494,200 B2
(45) Date of Patent: Nov. 15, 2016

(54) CLUTCH FOR POWER TOOL

(71) Applicant: Black & Decker Inc., Newark, DE (US)

(72) Inventors: Joseph P. Kelleher, Parkville, MD (US); Daniel L. Krout, Abingdon, MD (US); David C. Tomayko, Ellicott City, MD (US)

(73) Assignee: BLACK & DECKER INC., New Britain, CT (US)

( * ) Notice: Subject to any disclaimer, the term of this patent is extended or adjusted under 35 U.S.C. 154(b) by 372 days.

(21) Appl. No.: 13/828,149

(22) Filed: Mar. 14, 2013

(65) Prior Publication Data

US 2014/0274548 A1    Sep. 18, 2014

(51) Int. Cl.

| | |
|---|---|
| *F16H 3/66* | (2006.01) |
| *B25B 23/157* | (2006.01) |
| *F16D 7/00* | (2006.01) |
| *B25F 5/00* | (2006.01) |
| *B25B 23/14* | (2006.01) |
| *F16D 7/08* | (2006.01) |
| *B23B 45/00* | (2006.01) |
| *F16H 35/10* | (2006.01) |

(52) U.S. Cl.
CPC .............. *F16D 7/00* (2013.01); *B25B 23/141* (2013.01); *B25F 5/001* (2013.01); *F16D 7/08* (2013.01); *B23B 45/008* (2013.01); *B23B 2260/0445* (2013.01); *B25D 2250/165* (2013.01); *F16H 35/10* (2013.01)

(58) Field of Classification Search
CPC .............. B25B 23/141; B25B 45/008; B25D 2250/165
USPC .......................................... 475/264; 192/55.1
See application file for complete search history.

(56) References Cited

U.S. PATENT DOCUMENTS

| | | |
|---|---|---|
| 6,045,303 A | 4/2000 | Chung |
| 6,431,289 B1 | 8/2002 | Potter et al. |

(Continued)

FOREIGN PATENT DOCUMENTS

| | | |
|---|---|---|
| DE | 3321635 C2 | 6/1988 |
| DE | 102004051911 A1 | 4/2006 |

(Continued)

OTHER PUBLICATIONS

Bonnin, David—European Search Report—Jul. 7, 2014—7 pages—The Hague.

*Primary Examiner* — Robert Hodge
*Assistant Examiner* — Ryan Dodd
(74) *Attorney, Agent, or Firm* — Scott B. Markow

(57) ABSTRACT

A clutch for a power tool includes an adjustment ring configured to move axially relative to the housing while being rotated relative to the housing. A spring retainer is disposed axially rearward of the adjustment ring. The spring retainer is coupled for rotation together with the adjustment ring and configured to remain substantially axially stationary relative to the housing when rotated. A spring is disposed between the adjustment ring and the spring retainer. A clutch face is coupled to a portion of the transmission. A locking member is disposed between the spring retainer and the clutch face. The locking member is configured to transfer a holding force exerted by the spring to the clutch face. Rotation and axial movement of the adjustment ring alters the holding force exerted by the spring. When an amount of output torque exceeds the holding force, torque transmission to the output spindle is effectively interrupted.

29 Claims, 15 Drawing Sheets

(56) References Cited

U.S. PATENT DOCUMENTS

| | | |
|---|---|---|
| 6,502,648 B2 | 1/2003 | Milbourne |
| 6,676,557 B2 | 1/2004 | Milbourne et al. |
| 6,984,188 B2 | 1/2006 | Potter et al. |
| 7,066,691 B2 | 6/2006 | Doyle et al. |
| 7,101,300 B2 | 9/2006 | Milbourne et al. |
| 7,220,211 B2 | 5/2007 | Potter et al. |
| 7,404,781 B2 | 7/2008 | Milbourne et al. |
| 7,410,441 B2 | 8/2008 | Milbourne et al. |
| 7,452,304 B2 | 11/2008 | Hagan et al. |
| 7,469,753 B2 | 12/2008 | Klemm et al. |
| 7,537,064 B2 | 5/2009 | Milbourne et al. |
| 7,658,239 B2 | 2/2010 | Klemm et al. |
| 7,900,714 B2 | 3/2011 | Milbourne et al. |
| 8,104,546 B2 | 1/2012 | Aeberhard |
| 8,220,561 B2 | 7/2012 | Milbourne et al. |
| 8,251,158 B2 | 8/2012 | Tomayko et al. |
| 8,316,959 B2 | 11/2012 | Roehm |
| 2005/0150669 A1* | 7/2005 | Umemura ............. B23B 45/008 173/48 |
| 2006/0213675 A1 | 9/2006 | Whitmire et al. |
| 2007/0068693 A1 | 3/2007 | Whitmire et al. |
| 2007/0084614 A1 | 4/2007 | Whitmire et al. |
| 2011/0000347 A1* | 1/2011 | Stark ............................... 81/473 |
| 2012/0279738 A1 | 11/2012 | Tomayko et al. |

FOREIGN PATENT DOCUMENTS

| | | |
|---|---|---|
| EP | 0755755 A2 | 1/1997 |
| EP | 1555091 B1 | 10/2008 |
| EP | 2103390 B1 | 8/2011 |
| WO | 2012061176 A2 | 5/2012 |
| WO | 2012061176 A3 | 5/2012 |

* cited by examiner

CLUTCH FOR POWER TOOL

TECHNICAL FIELD

This application relates to power tools such as power driven drills and power screwdrivers. More specifically, the present invention relates to clutch mechanisms for use with such power tools.

BACKGROUND

Many power tools such as power driven drills and screwdrivers include a clutch between the transmission and the output shaft of the power tool. The purpose of the clutch is to reduce or effectively interrupt transmission of torque from the transmission to the output shaft when the torque exceeds a threshold amount. This helps to avoid adverse events when such tools are used, e.g., to insert threaded fasteners, such as stripping of the head or threads of the fastener, fracture of the fastener, cam-out of a screwdriver bit, and over tightening of the fastener.

Examples of certain types of clutches can be found in, e.g., U.S. Pat. Nos. 7,066,691 and 8,251,158, which are incorporated by reference. The clutches disclosed in these patents generally include a clutch ring that abuts against one or more springs. The springs presses one or more locking members (e.g. clutch plates, balls, and/or pins) against a clutch face coupled to a portion of the transmission. When the torque overcomes the force exerted by the spring and the locking members, torque transmission from the transmission to the output spindle is reduced or effectively interrupted.

In some embodiments, the force exerted by the spring, and thus the threshold torque, may be user adjustable. For example, the clutch may include an external adjustment sleeve that is rotatable to move an internal clutch ring to alter an amount of compression of the spring. This may be achieved, e.g., by having the clutch ring be threaded to a portion of the housing. However, a deficiency of such a design is that when the clutch ring rotates, the spring(s) may become twisted, which may reduce their life and/or effectiveness.

SUMMARY

In an aspect, a power tool includes a housing, a motor disposed in the housing, an output spindle received at least partially in the housing, and a transmission disposed in the housing. The transmission is configured to selectively transmit torque from the motor to the output spindle. A clutch assembly is disposed between the transmission and the output spindle. The clutch assembly includes a clutch adjustment ring configured to move axially relative to the housing while being rotated relative to the housing. A spring retainer is disposed axially rearward of the clutch adjustment ring, is coupled for rotation together with the clutch adjustment ring, and is configured to remain substantially axially stationary relative to the housing when rotated. A spring is disposed between the clutch adjustment ring and the spring retainer. A clutch face is coupled to a portion of the transmission. A locking member is disposed between the spring retainer and the clutch face. The locking member is configured to transfer a holding force exerted by the spring to the clutch face. Rotation and axial movement of the clutch adjustment ring alters the holding force of the spring. When an output torque exceeds the holding force, torque transmission from the transmission to the output shaft is effectively interrupted.

Implementations of this aspect may include one or more of the following features. The clutch assembly may include a clutch housing having a rearward base portion configured to receive the clutch face, and a nose portion configured to receive at least a portion of the output spindle. The nose portion may include an externally threaded portion, and the clutch adjustment ring may be internally threaded over the externally threaded portion. The spring retainer may be internally unthreaded and received over the nose portion. A clutch adjustment sleeve may be non-rotatably coupled to the clutch adjustment ring and to the spring retainer, such that rotation of the clutch adjustment sleeve causes rotation of the clutch adjustment ring and the spring retainer. The clutch adjustment ring has a first recess that receives a first end of the spring, and the spring retainer has a second recess that receives a second end of the spring. The spring includes one of a compression spring and a wave spring. A clutch plate may be disposed between the spring retainer and the locking member, the clutch plate transferring the holding force from the spring retainer to the locking member. The locking member may include at least one of a ball and a pin. The clutch face may include a ramped surface. Torque transmission from the transmission to the output shaft is effectively interrupted when the output torque causes the locking member rides over the ramped surface. The transmission may include a planetary gear set having at least one ring gear and the clutch face may be connected to the at least one ring gear, such that torque transmission is effectively interrupted when the ring gear is permitted to rotate relative to the housing.

In another aspect, a clutch assembly is for use with a power tool that has a housing, a transmission and an output spindle. The clutch assembly includes a clutch adjustment ring configured to move axially relative to the housing while being rotated relative to the housing. A spring retainer is disposed axially rearward of the clutch adjustment ring. The spring retainer is coupled for rotation together with the clutch adjustment ring and configured to remain substantially axially stationary relative to the housing when rotated. A spring is disposed between the clutch adjustment ring and the spring retainer. A clutch face is coupled to a portion of the transmission. A locking member is disposed between the spring retainer and the clutch face. The locking member is configured to transfer a holding force exerted by the spring to the clutch face. Rotation and axial movement of the clutch adjustment ring alters the holding force exerted by the spring. When an amount of output torque exceeds the holding force, torque transmission from the transmission to the output shaft is effectively interrupted.

Implementations of this aspect may include one or more of the following features. The clutch assembly may include a clutch housing having a rearward base portion configured to receive the clutch face, and a nose portion configured to receive at least a portion of the output spindle. The nose portion may include an externally threaded portion, and the clutch adjustment ring may be internally threaded over the externally threaded portion. The spring retainer may be internally unthreaded and received over the nose portion. A clutch adjustment sleeve may be non-rotatably coupled to the clutch adjustment ring and to the spring retainer, such that rotation of the clutch adjustment sleeve causes rotation of the clutch adjustment ring and the spring retainer. The clutch adjustment ring has a first recess that receives a first end of the spring, and the spring retainer has a second recess that receives a second end of the spring. The spring includes one of a compression spring and a wave spring. A clutch plate may be disposed between the spring retainer and the locking member, the clutch plate transferring the holding force from the spring retainer to the locking member. The locking member may include at least one of a ball and a pin. The clutch face may include a ramped surface. Torque transmission from the transmission to the output shaft is effectively interrupted when the output torque causes the locking member rides over the ramped surface.

In another aspect, a power tool includes a housing, a motor disposed in the housing, an output spindle received at least partially in the housing, a planetary gear transmission disposed in the housing and configured to selectively transmit torque from the motor to the output spindle, and a clutch assembly disposed between the planetary gear transmission and the output spindle. The planetary gear transmission includes an input sun gear, a planet gear meshed with the input sun gear, an output carrier carrying the planet gear and configured to transmit output torque to the output spindle when the output carrier rotates, and a ring gear meshed with the planet gear. The a clutch assembly includes a clutch housing having a rearward base portion, and a nose portion having an externally threaded portion. An internally threaded clutch adjustment ring is received over the externally threaded portion of the clutch housing and configured to move axially relative to the clutch housing when being rotated relative to the clutch housing. A non-internally threaded spring retainer is disposed axially rearward of the clutch adjustment ring over the nose portion. The spring retainer is configured to rotate relative to the clutch housing while remaining substantially axially stationary. An external clutch adjustment sleeve is received over and non-rotatable coupled to the clutch adjustment ring and the spring retainer such that rotation of the clutch adjustment sleeve causes rotation of the clutch adjustment ring and the spring retainer. A spring is disposed between the clutch adjustment ring and the spring retainer. A clutch face is fixedly coupled to a portion of the ring gear. A locking member is disposed between the spring retainer and the clutch face. The locking member is configured to transfer a holding force exerted by the spring to the clutch face. Rotation and axial movement of the clutch adjustment ring alters the holding force exerted by the spring. When an output torque does not exceed the holding force, the locking member retains the ring gear from rotating relative to the housing, which causes the sun gear to cause the planet gears to orbit the sun gear, which causes the output carrier to rotate and transmit torque to the output spindle. When the output torque exceeds the holding force, the locking members allow the ring gear to rotate relative to the housing, which causes the sun gear to allow the planet gears to rotate without orbiting the sun gear, which causes the output carrier to remain substantially stationary and effectively interrupts torque transmission to the output spindle.

Advantages may include one or more of the following. The spring retainer prevents or inhibits the spring from becoming twisted because it rotates together with the adjustment ring. These and other advantages and features will be apparent from the description, the drawings, and the claims.

DETAILED DESCRIPTION

Figure 1:
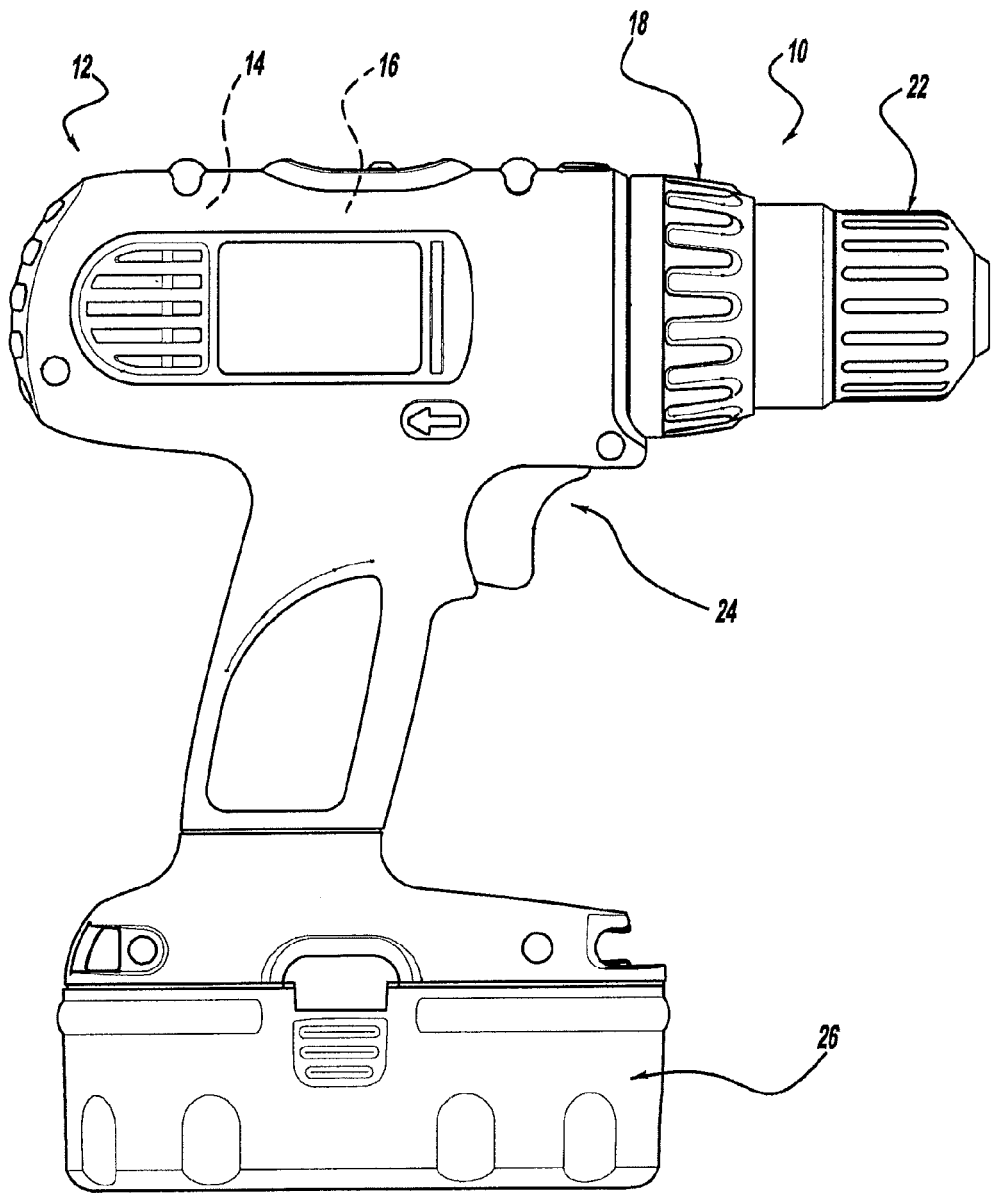
FIG. 1 is a side view of a power tool constructed in accordance with the teaching of the present invention.
Figure 2:
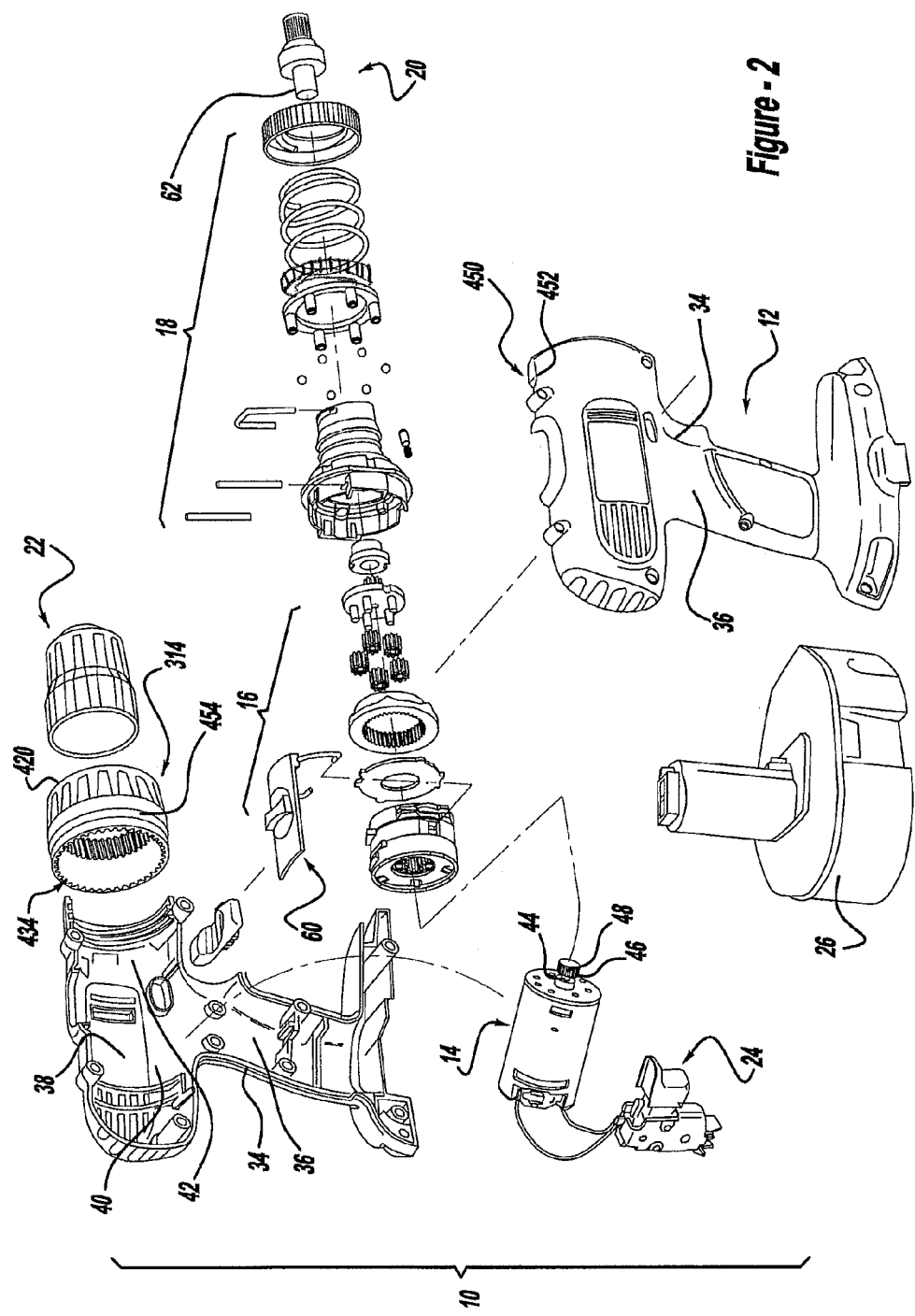
FIG. 2 is an exploded perspective view of a portion of the power tool of FIG. 1.

With reference to FIGS. 1 and 2 of the drawings, a power tool constructed in accordance with the teachings of the present invention is generally indicated by reference numeral 10. As those skilled in the art will appreciate, embodiments may include either a corded or cordless (battery operated) device, such as a portable screwdriver or drill. In the particular embodiment illustrated, the power tool 10 is a cordless drill having a housing 12, a motor assembly 14, a multi-speed transmission assembly 16, a clutch mechanism 18, an output spindle assembly 20, a chuck 22, a trigger assembly 24 and a battery pack 26. Those skilled in the art will understand that several of the components of the power tool 10, such as the chuck 22, the trigger assembly 24 and the battery pack 26, are conventional in nature and therefore need not be discussed in significant detail in the present application. Reference may be made to a variety of publications for a more complete understanding of the conventional features of the power tool 10. One example of such publications is U.S. Pat. No. 5,897,454 issued Apr. 27, 1999, the disclosure of which is hereby incorporated by reference as if fully set forth herein.

The housing 12 includes a pair of mating handle shells 34 that cooperate to define a handle portion 36 and a drive train or body portion 38. The trigger assembly 24 and the battery pack 26 are mechanically coupled to the handle portion 36 and electrically coupled to the motor assembly 14 in a conventional manner that is not specifically shown but which is readily the capabilities of one having an ordinary level of skill in the art. The body portion 38 includes a motor cavity 40 and a transmission cavity 42. The motor assembly 14 is housed in the motor cavity 40 and includes a rotatable output shaft 44, which extends into the transmission cavity 42. A motor pinion 46 having a plurality of gear teeth 48 is coupled for rotation with the output shaft 44. The trigger assembly and battery pack 26 cooperate to selectively provide electric power to the motor assembly 14 in a manner that is generally well known in the art so as to permit the user of the power tool 10 to control the speed and direction with which the output shaft 44 rotates.

Transmission Assembly

The transmission assembly 16 is housed in the transmission cavity 42 and includes a speed selector mechanism 60. The transmission assembly 16 receives a rotary input from the motor pinion 46 and converts that input to a relatively lower speed, higher torque output that is transmitted to the shaft 62 of the output spindle assembly 20. The transmission assembly 16 includes a plurality of reduction elements that are selectively engaged by the speed selector mechanism 60 to provide a plurality of speed ratios. Each of the speed ratios multiplies the speed and torque of the drive input in a predetermined manner, permitting the output speed and torque of the transmission assembly 16 to be varied in a desired manner between a relatively low speed, high torque output and a relatively high speed, low torque output. Rotary power output from the transmission assembly 16 is transmitted to the output spindle assembly, to which the chuck 22 is coupled for rotation, to permit torque to be transmitted to a tool bit (not shown). The clutch mechanism 18 is coupled to the transmission assembly and is operable for limiting the magnitude of the torque associated with the output of the transmission assembly 16 to a predetermined, selectable torque limit.

Figure 3:
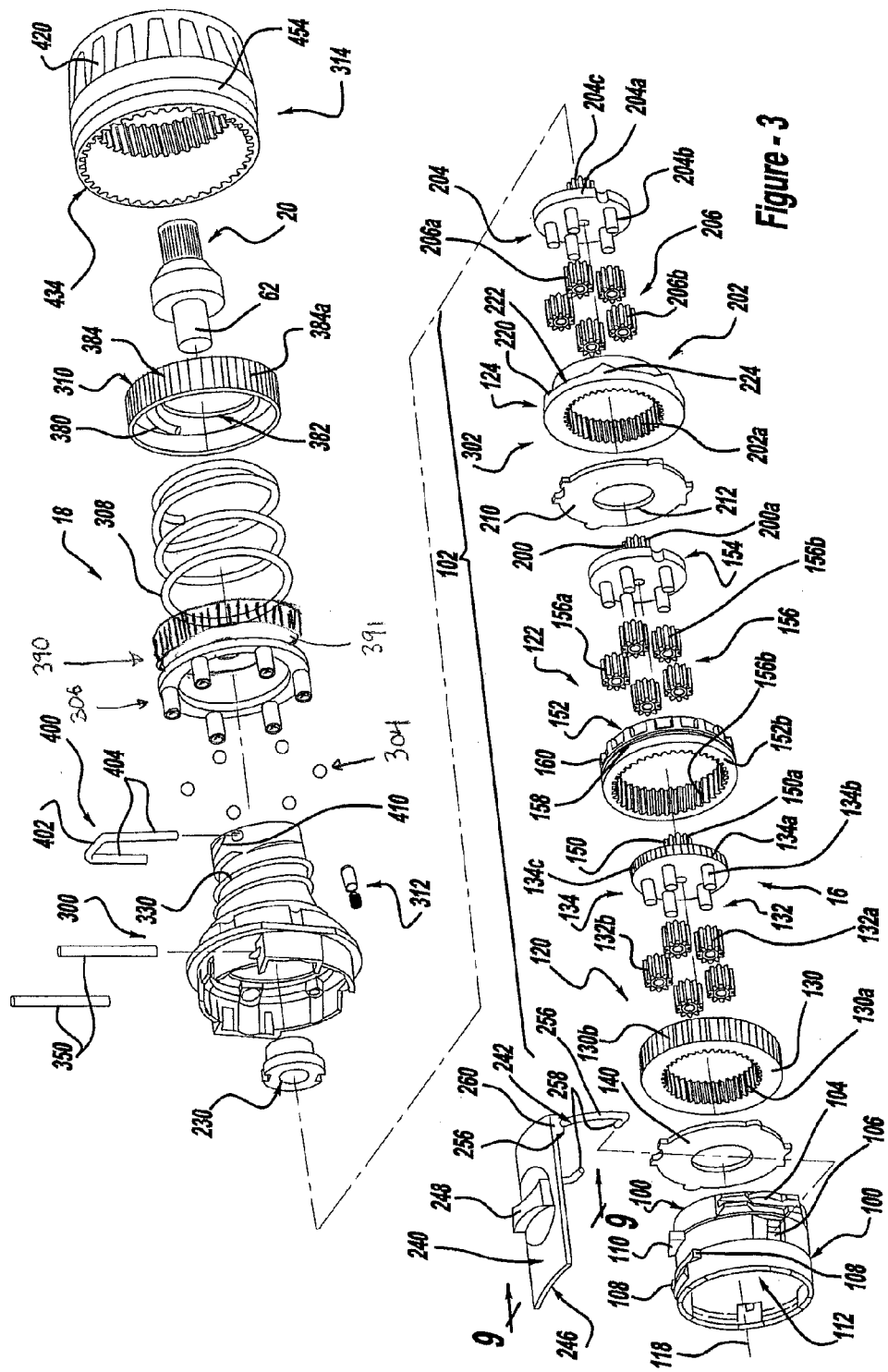
FIG. 3 is an enlarged view of a portion of FIG. 2 illustrating the transmission assembly and the clutch mechanism in greater detail.

With additional reference to FIG. 3, the transmission assembly 16 is illustrated to further include a gear case 100 that houses a three-stage, two-speed gear train 102. With additional reference to FIG. 4, the gear case 100 is shaped in a generally hollow cylindrical manner and includes a fastening tab 104 and a clip aperture 106 on each of its lateral sides, a pair of guide rails 108 and a guide tab 110 that is located on its top surface, and a central cavity 112 that extends longitudinally through the gear case 100. Each fastening tab 104 terminates at its outward face at a coupling recess 114 that extends in a direction that is generally transverse to the central cavity 112. The coupling recess 114 is preferably arcuately shaped, and in the particular embodiment illustrated, is illustrated to be generally U-shaped. Each clip aperture 106 extends through the wall 116 of the gear case 100 along the longitudinal axis 118 of the central cavity 112 and intersects the central cavity 112. The guide rails 108 positioned rearwardly of the guide tab 110 and are spaced laterally apart from one another. The guide rails 108 and the guide tab 110 will be discussed, in further detail, below.

The gear train 102 is illustrated to be a planetary type gear train, having a first planetary gear set 120, a second planetary gear set 122 and a third planetary gear set 124. In the example provided, each of the first, second and third gear sets 120, 122 and 124 are operable in an active mode, wherein the gear set performs a speed reduction and torque multiplication operation, while the second planetary gear set 122 is also operable in an inactive mode, wherein it provides a rotary output having a speed and torque that is about equal to that which is input to it.

The first planetary gear set 120 includes first ring gear 130, a first set of planet gears 132 and a first reduction carrier 134. The first ring gear 130 is an annular structure, having a plurality of gear teeth 130a that are formed about its interior diameter and a plurality of gear case engagement teeth 130b that are formed onto its outer perimeter. With additional reference to FIG. 5, the first ring gear 130 is disposed within the central cavity 112 of the gear case 100 such that the gear case engagement teeth 130b engage mating teeth 130c formed on the inner surface of the gear case 100 to inhibit relative rotation between the first ring gear 130 and the gear case 100. As the gear case engagement teeth 130b terminate prior to the rear face 130d of the first ring gear 130, forward movement of the first ring gear 130 is halted by interference between the mating teeth 130c that are formed on the inner surface of the gear case 100 and the portion of the first ring gear 130 that is disposed rearwardly of the gear case engagement teeth 130b.

Figure 7:
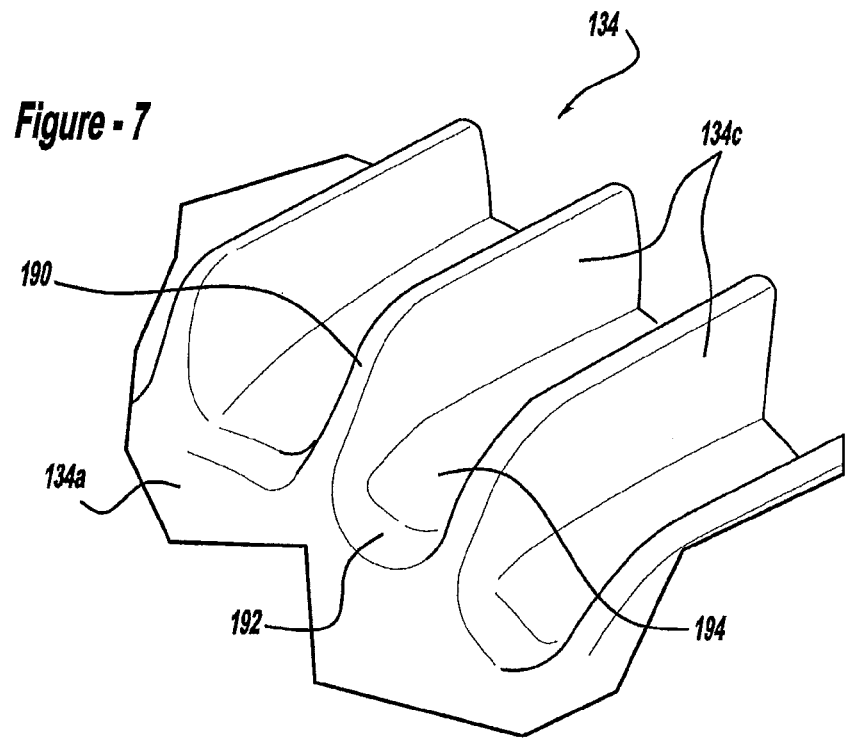
FIG. 7 is a perspective view of a portion of the transmission assembly illustrating the contour of the top and rear surfaces of the second reduction carrier.
Figure 8:
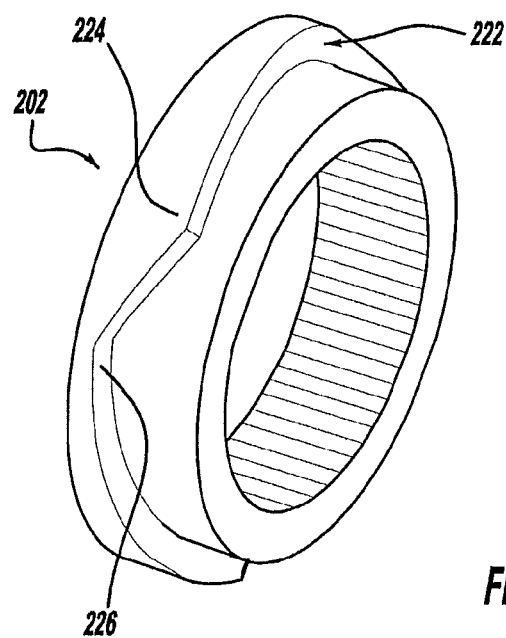
FIG. 8 is a perspective view of a portion of the transmission assembly illustrating the third ring gear in greater detail.

The first reduction carrier 134 includes a body 134a, which is formed in the shape of a flat cylinder and a plurality of cylindrical pins 134b that extend from the rearward face of the body 134a, and a plurality of 134c A plurality of gear teeth 134c are formed into the outer perimeter of the body 134a and are sized to engage the gear teeth 152a of the second ring gear 152. With reference to FIG. 7, the profile of the gear teeth 134c of the body 134a is illustrated in greater detail. As shown, each tooth 134c terminates at a gradual radius 190 at the forward face of the body 134a but terminates abruptly at the rearward face of the body 134a. A radius 192 is also formed on the valleys 194 between the gear teeth 134c. The first set of planet gears 132 includes a plurality of planet gears 132a, each of which being generally cylindrical in shape and having a plurality of gear teeth 132b formed onto its outer perimeter and a pin aperture (not specifically shown) formed through its center. Each planet gear 132a is rotatably supported on an associated one of the pins 132b of the first reduction carrier 134 and is positioned to be in meshing engagement with the gear teeth of the first ring gear 130. A first annular thrust washer 140 is fitted to the end of the gear case 100 proximate the motor assembly 14 and prevents the planet gears 132 from moving rearwardly and disengaging the pins 134b of the first reduction carrier 134. A raised portion 142 is formed onto the front and rear faces of each planet gear 132 to inhibit the gear teeth 132b of the planet gears 132 from rubbing on the first reduction carrier 134 and the first thrust washer 140. The teeth 46a of the motor pinion 46 are also meshingly engaged with the teeth 132b of the planet gears 132 and as such, the motor pinion 46 serves as the first sun gear for the first planetary gear set 120.

The second planetary gear set 122 is disposed within the central cavity 112 forward of the first planetary gear set 120 and includes a second sun gear 150, a second ring gear 152, a second reduction carrier 154 and a second set of planet gears 156. The second sun gear 150 is fixed for rotation with the first reduction carrier 134 and includes a plurality of gear teeth 150a that extend forwardly from the flat, cylindrical portion of the first reduction carrier 134.

Figure 6:
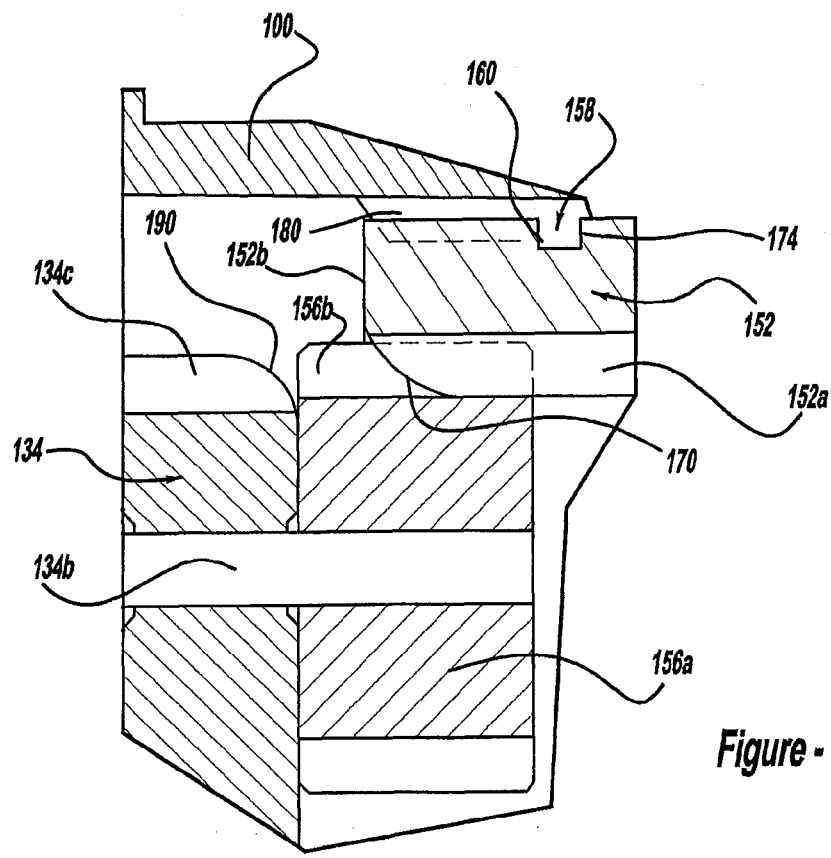
FIG. 6 is a sectional view of a portion of the transmission assembly illustrating the second planetary gear set in the active position.

The second ring gear 152 is an annular structure having a plurality of gear teeth 152a formed about its interior diameter, an annular clip groove 158 formed into its outer perimeter and a plurality of gear case engagement teeth 160 that are formed onto its outer perimeter. The gear teeth 152a may be heavily chamfered at the rear face 152b of the second ring gear 152 but terminate abruptly its front face. More preferably, a heavy radius 170 is formed onto the rear face 152b and the sides of each of the gear teeth 152a as illustrated in FIG. 6, with the heavy radius 170 being employed rather than the heavy chamfer as the heavy radius 170 on the gear teeth 152a provides for better engagement between the second ring gear 152 and the second reduction carrier 154, as will be described in more detail, below. In the example illustrated, the clip groove 158 is a rectangular slot having a pair of sidewalls 174. The clip groove 158 will be discussed in further detail, below.

Figure 5:
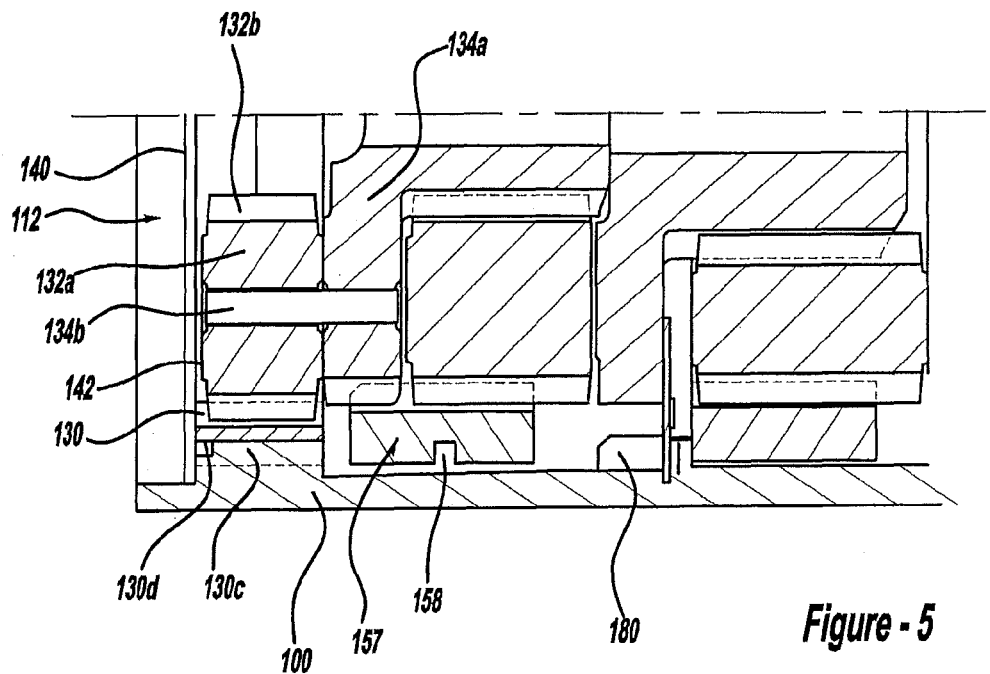
FIG. 5 is a sectional view of a portion of the power tool of FIG. 1 taken along the longitudinal axis of the power tool and illustrating the construction of the transmission assembly.

The second ring gear 152 is movably disposed within the central cavity 112 of the gear case 100 between a first position as shown in FIG. 6, wherein the gear case engagement teeth 160 engage mating teeth 180 formed on the inner surface of the gear case 100 to inhibit relative rotation between the second ring gear 152 and the gear case 100, and a second position as shown in FIG. 5, wherein the gear case engagement teeth 160 are axially spaced apart from the mating teeth 180 to thereby permit relative rotation between the second ring gear 152 and the gear case 100.

The second reduction carrier 154 includes a body 154a, which is formed in the shape of a flat cylinder, and plurality of pins 154b that extend from the rearward face of the body 154a.

Referring back to FIGS. 3 and 5, the second set of planet gears 156 is shown to include a plurality of planet gears 156a, each of which being generally cylindrical in shape and having a plurality of gear teeth 156b and a pin aperture (not specifically shown) in its center. Each planet gear 156a is supported for rotation on an associated one of the pins 154b of the second reduction carrier 154 and is positioned such that the gear teeth 156b are in meshing engagement with gear teeth 152a of the second ring gear 152.

The third planetary gear set 124 is disposed on the side of the second planetary gear set 122 opposite the first planetary gear set 120. Like the second planetary gear set 122, the third planetary gear set 124 includes a third sun gear 200, a third ring gear 202, a third reduction carrier 204 and a third set of planet gears 206. The third sun gear 200 is fixed for rotation with the body 154a of the second reduction carrier 154 and includes a plurality of gear teeth 200a that extend forwardly from the body 154a. An annular second thrust washer 210 is disposed between the second ring gear 152 and the third ring gear 202 and operates to limit the forward movement of the second ring gear 152 and the rearward movement of the third ring gear 202 and the third set of planet gears 206. The second thrust washer 210, which includes an aperture 212 through which the third sun gear 200 extends, engages the inner surface of the gear case 100.

The third ring gear 202 is an annular structure having a plurality of gear teeth 202a formed about its interior diameter and an outer radial flange 220 that forms its outer perimeter. A clutch face 222 is formed into the forward surface of the outer radial flange 220. In the particular embodiment illustrated, the clutch face 222 is shown to have an arcuate cross-sectional profile and is further defined by a plurality of peaks 224 and valleys 226 that are arranged relative to one another to form a series of ramps that are defined by an angle of about 18°. Those skilled in the art will understand, however, that clutch faces of other configurations, such as those having a sinusoidal shape, may also be employed. Those skilled in the art will also understand that while the clutch face 222 is shown to be unitarily formed with the third ring gear 202, multi-component configurations may also be employed. Such multi-component configurations include, for example, an annular clutch face ring (not shown) having a rearward facing first side for engaging the third ring gear 202 and a forward facing second side that forms the clutch face 222. Configuration in this latter manner may be advantageous, for example, when it is necessary for the clutch face 222 to have properties or characteristics (e.g., lubricity, hardness, toughness, surface finish) that are different from the properties or characteristics of the third ring gear 202.

The third reduction carrier 204 includes a body 204a, which is formed in the shape of a flat cylinder, and a plurality of cylindrical pins 204b, which extend from the rearward face of the body 204a, and a coupling portion 204c that extends from the forward face of the body 204a. Rotary power transmitted to the third reduction carrier 204 is transmitted through the coupling portion 204c to a coupling member 230 that engages the shaft 62 of the output spindle assembly 20. Those skilled in the art will understand that various other coupling devices and methods may be utilized to couple the third reduction carrier 204 to the output spindle assembly 20, such as a direct coupling of the shaft 62 of the output spindle assembly 20 to the body 204a of the third reduction carrier 204.

The third set of planet gears 206 includes a plurality of planet gears 206a, each of which being generally cylindrical in shape and having a plurality of gear teeth 206b formed onto its outer perimeter and a pin aperture (not specifically shown) formed through its center. Each planet gear 206a is rotatably supported on an associated one of the pins 204b of the third reduction carrier 204 and is positioned to be in meshing engagement with the gear teeth 202a of the third ring gear 202.

Figure 9:
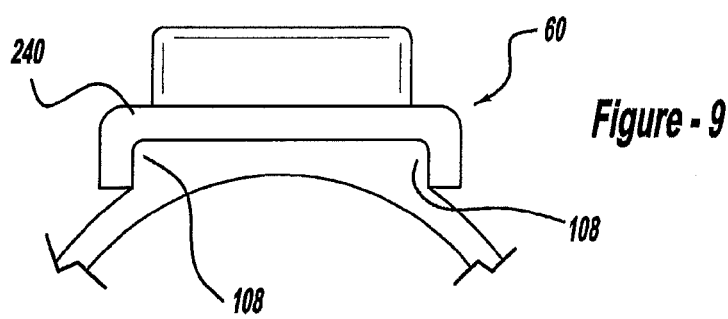
FIG. 9 is a sectional view taken along the line 9-9 of FIG. 3.
Figure 10:
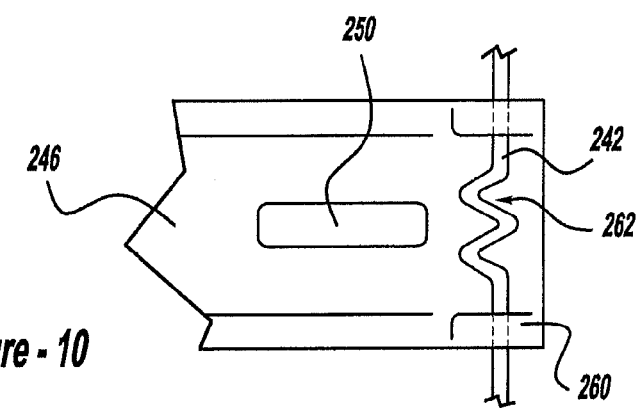
FIG. 10 is a partial bottom view of a portion of the transmission assembly illustrating the speed selector mechanism in greater detail.

The speed selector mechanism 60 is illustrated to include a slider body 240 and a clip structure 242. The slider body 240 is an elongated structure that is configured to be housed between the handle shells 34 and selectively slid along the top of the gear case 100. The slider body 240 includes an attachment groove 246, which permits the clip structure 242 to be attached to the slider body 240, and a selector tab 248, which is configured to receive an input from the user of the power tool 10 to switch the second planetary gear set 122 between the active and inactive modes. With additional reference to FIGS. 9 and 10, a slot 250 is formed into the underside of the slider body 240 and is sized to engage the guide tab 110 that extends from the top surface of the gear case 100. The guide rails 108 are spaced laterally apart to receive the slider body 240. The guide tab 110 and the guide rails 108 cooperate with the sides of the slot 250 and the sides of the attachment groove 246, respectively, to guide the slider body 240 as the slider body 240 is moved in an axial direction along the top surface of the gear case 100.

Returning to FIG. 3, the clip structure 242 is a wire that is formed to include a circular body portion 256 and a pair of end tabs 258 that extend inwardly from the body portion 256. The body portion 256 is fixedly coupled to an attachment tab 260, which is illustrated to be a pair of trunnions that extend downwardly from the slider body 240. The body portion 256 is sized to fit over the outer circumference of the gear case 100 and preferably includes a rotation-inhibiting element 262 to inhibit the clip structure 242 from rotating relative to the attachment tab 260. In the embodiment provided, the rotation-inhibiting element 262 is illustrated to include a plurality of bends, such as M-, N-, S-, or Z-shaped bends, that are formed into the wire and which are molded into or abut the underside of the slider body 240. Each of the end tabs 258 extends through an associated one of the clip apertures 106 in the sides of the gear case 100 and engages the annular clip groove 158 that is formed into the perimeter of the second ring gear 152. The wire that forms the clip structure 242 is somewhat smaller in diameter than the width of the clip groove 158.

Alternatively, the rotation-inhibiting element 262 may include a plurality of tabs that are formed from bends in the body portion 256 of the wire, wherein each tab is defined by a circumferentially extending segment that is offset radially outwardly from the remainder of the body portion 256. Each of the tabs is configured to be received in a corresponding aperture formed into the slider body 240 such that the front and rear faces of each tab engage the sides of the apertures in the slider body 240. The tabs, being confined within an associated aperture in the slider body 240, inhibit relative movement between the slider body 240 and the body portion 256 of the clip structure 242.

Sliding movement of the slider body 240 relative to the gear case 100 is operable for transmitting a force through the end tabs 258 of the clip structure 242 and to the second ring gear 152 which may be used to move the second ring gear 152 between the first and second positions. When the second ring gear 152 is positioned in the first position as illustrated in FIG. 6, the engagement teeth 160 of the second ring gear 152 are engaged to the mating engagement teeth 180 of the gear case 100 and the gear teeth 152a of the second ring gear 152 are engaged to only the gear teeth 156b of the planet gears 156a of the second planet gear set 156, thereby permitting the second planetary gear set 122 to operate in the active mode. When the second ring gear 152 is positioned in the second position as illustrated in FIG. 5, the engagement teeth 160 of the second ring gear 152 are not engaged to the mating engagement teeth 180 of the gear case 100 and the gear teeth 152a of the second ring gear 152 are engaged to both the gear teeth 156b of the planet gears 156a of the second planet gear set 156 and the gear teeth 134c of the first reduction carrier 134, thereby permitting the second planetary gear set 122 to operate in the inactive mode.

Clutch Mechanism—First Embodiment

In FIG. 3, one embodiment of the clutch mechanism 18 is illustrated to include a clutch housing 300, a clutch member 302, a plurality of locking members in the form of balls 304, a clutch plate 306, a spring retainer 390, a spring 308, an adjustment ring 310, a detent mechanism 312 and a clutch adjustment sleeve 314. With additional reference to FIG. 4, the clutch housing 300 is illustrated to include a wall member 320, which defines a hollow cavity or bore 322 that extends along the longitudinal axis of the clutch housing 300, a base portion 324 and a nose portion 326 that extends forwardly from the base portion 324. The rearward end of the bore 322 is sized to receive a forward portion of the gear case 100, the third ring gear 202 and the third reduction carrier 204, while the forward portion of the bore 322 is sized somewhat smaller so as to receive the coupling member 230 and the shaft 62 of the output spindle assembly 20. The nose portion 326, which is somewhat smaller in diameter than the base portion 324, is generally cylindrical, having a helical thread form 330 that wraps around its perimeter.

Figure 11:
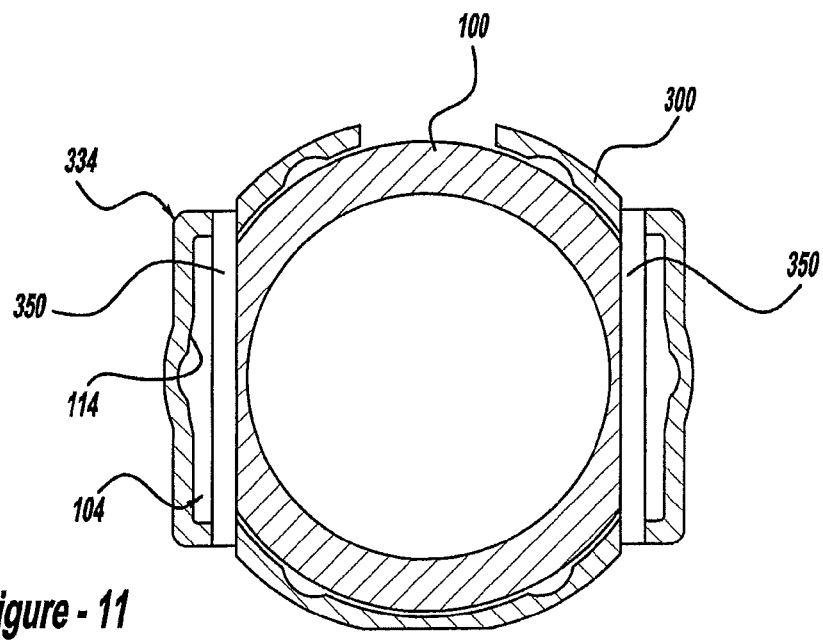
FIG. 11 is a sectional view of a portion of the power tool of FIG. 1 taken through the gear case and clutch adjustment sleeve and illustrating the method by which the transmission assembly and the clutch mechanism are coupled.

The base portion 324 includes a pair of outboard tabs 334, which are formed on the lateral sides of the base portion 324, a plurality of leg apertures 336, which extend generally perpendicular to the longitudinal axis of the bore 322, and a detent aperture 338 for receiving the detent mechanism 312. Each outboard tab 334 is configured to receive an associated one of the fastening tabs 104 and includes a pin aperture 340. In the particular embodiment illustrated, each outboard tab 334 is defined by an outer lateral wall 342, a lower wall 344, and an upper wall 346, through which the pin aperture 340 extends. With additional reference to FIG. 11, a cylindrical locking pin 350 is fitted through the pin aperture 340 in each outboard tab 334 and the coupling recess 114 in the associated fastening tab 104 and thereby fixedly but removably couples the clutch housing 300 to the gear case 100. The locking pins 350 are advantageous in that they eliminate the need for threaded fasteners, fastening tools and the use of bosses in the gear case 100 and the clutch housing 300 that are configured for receiving a conventional threaded fastener. The leg apertures 336 are circumferentially spaced about the nose portion 326 and extend through the base portion 324 and intersect the rearward portion of the bore 322. The detent aperture 338 extends through the base portion 324 between the clutch adjustment sleeve 314 and the gear case 100 and is sized to receive a portion of the detent mechanism 312.

Figure 12:
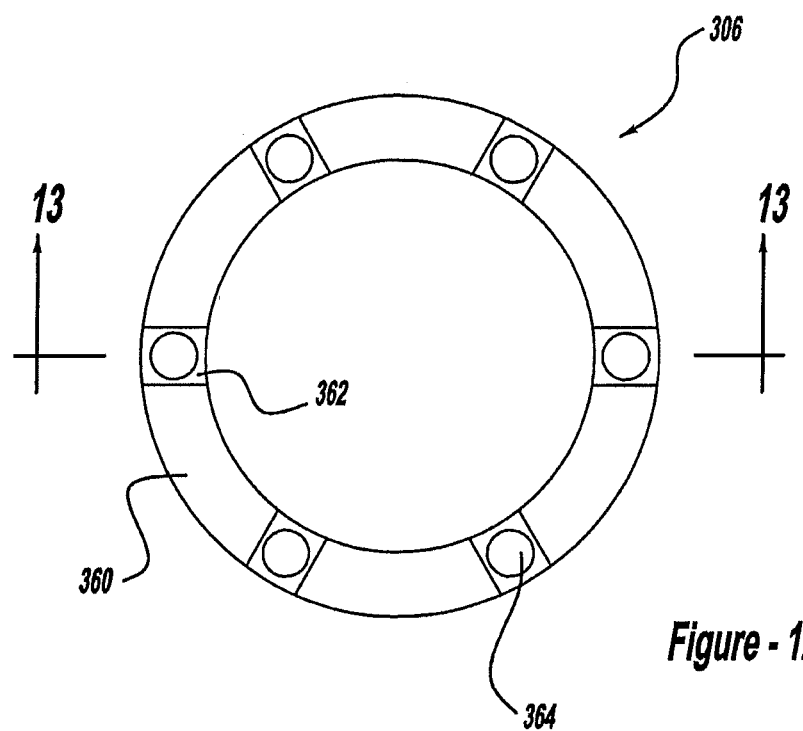
FIG. 12 is a side view of a the clutch plate.
Figure 13:
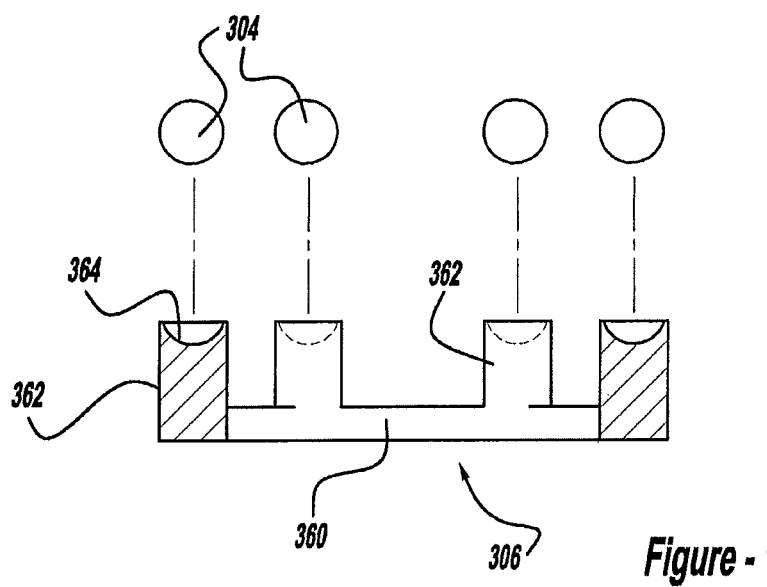
FIG. 13 is an exploded side view in partial section illustrating the clutch plate and the balls.

In FIGS. 3, 12 and 13, the clutch plate 306 is illustrated to be a unitarily formed structure that includes a washer-like annular plate member 360 and a plurality of leg members 362 that are coupled to and circumferentially spaced about the annular plate member 360. The leg members 362 have a generally circular cross-section and extend generally perpendicularly from the plate member 360. The end of the each leg member 362 opposite the plate member 360 terminates in a spherical recess 364 that is configured to receive one of the balls 304, which are illustrated to be hardened bearing balls. The clutch plate 306 is disposed over the nose portion 326 of the clutch housing 300 and moved axially rearward to push the leg members 362 through the leg apertures 336 in the base portion 324, as well as to bring each of the balls 304 into contact with the clutch face 222 and an associated one of the spherical recesses 364.

Figure 14:
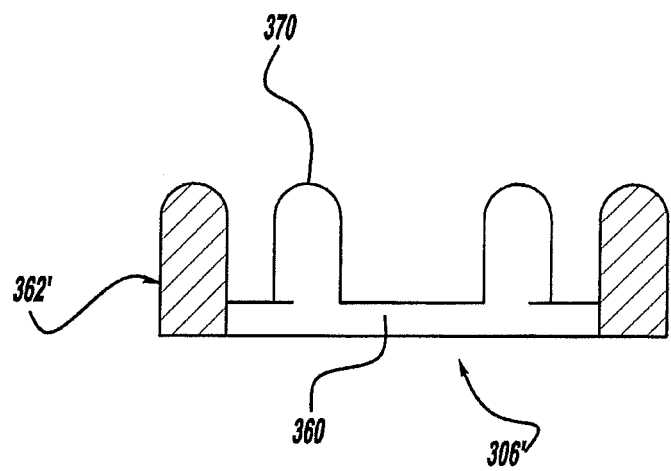
FIG. 14 is a sectional view similar to that of FIG. 13 but illustrating an alternate embodiment of the clutch plate.

In an alternate embodiment illustrated in FIG. 14, the clutch plate 306' is illustrated to be similar to the clutch plate 306, except that the ends of the leg members 362' opposite the annular plate member 360 terminate at a spherical protrusion 370, rather than a spherical recess. Configuration in this manner is advantageous in that it eliminates the balls 304 from the clutch mechanism 18.

Figure 15:
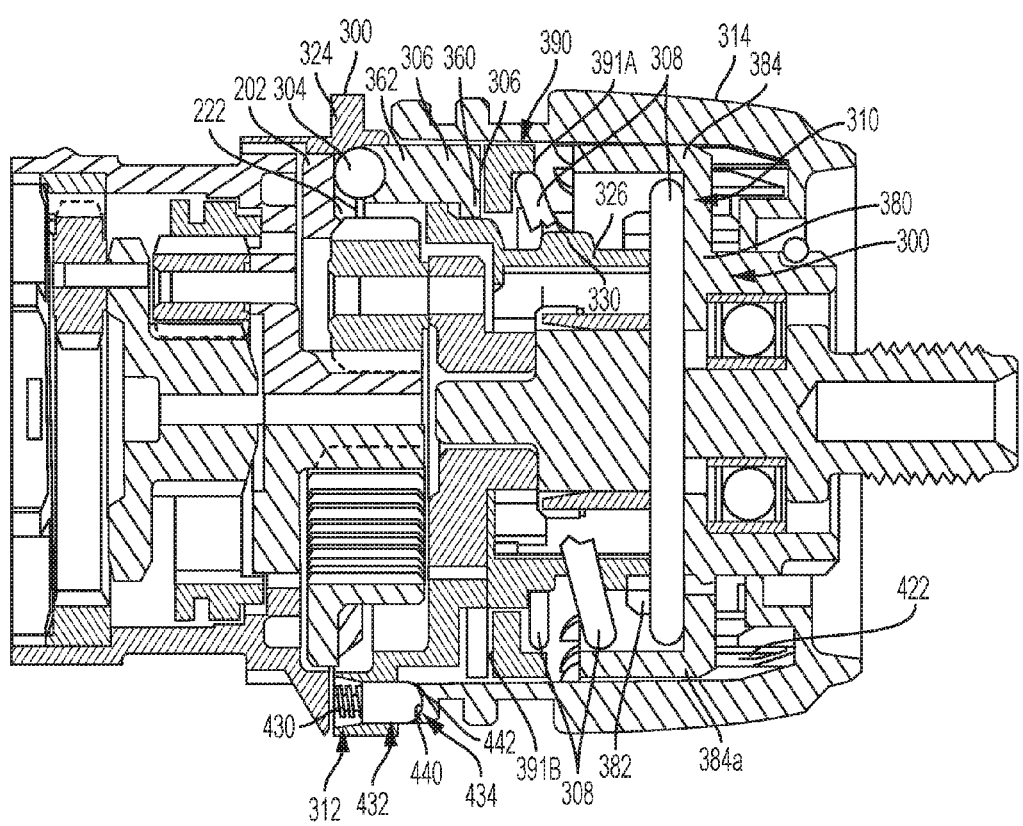
FIG. 15 is a sectional view of a portion of the power tool of FIG. 1 taken along the longitudinal axis and illustrating the clutch mechanism in greater detail.
Figure 16A:
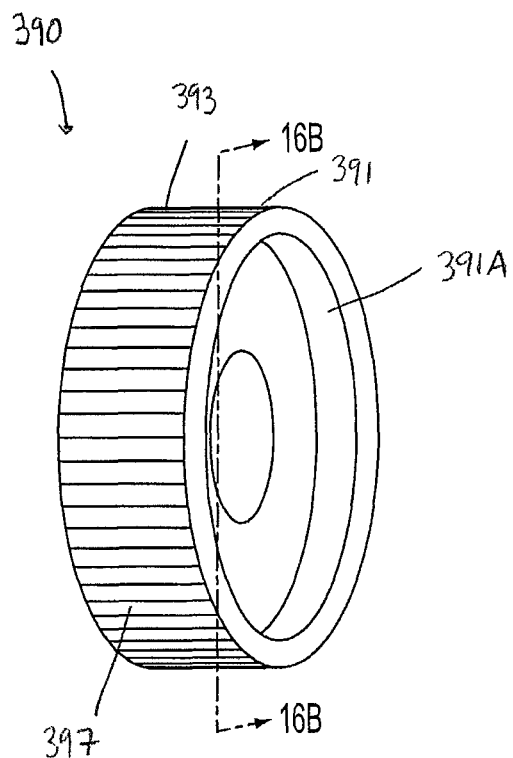
FIGS. 16A and 16B are perspective views of the spring retainer of the clutch mechanism illustrated in FIG. 3.
Figure 16B:
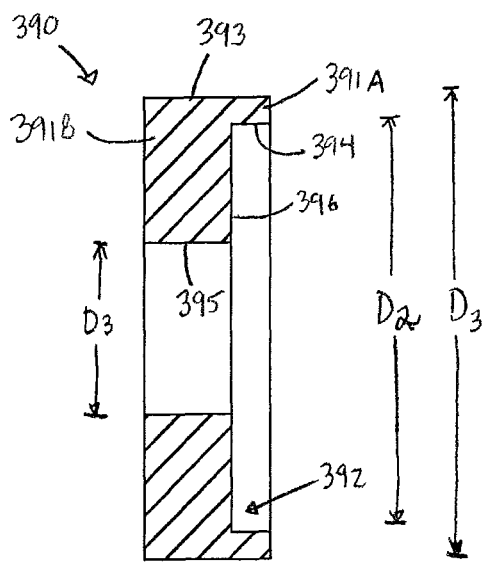
Figure 17:
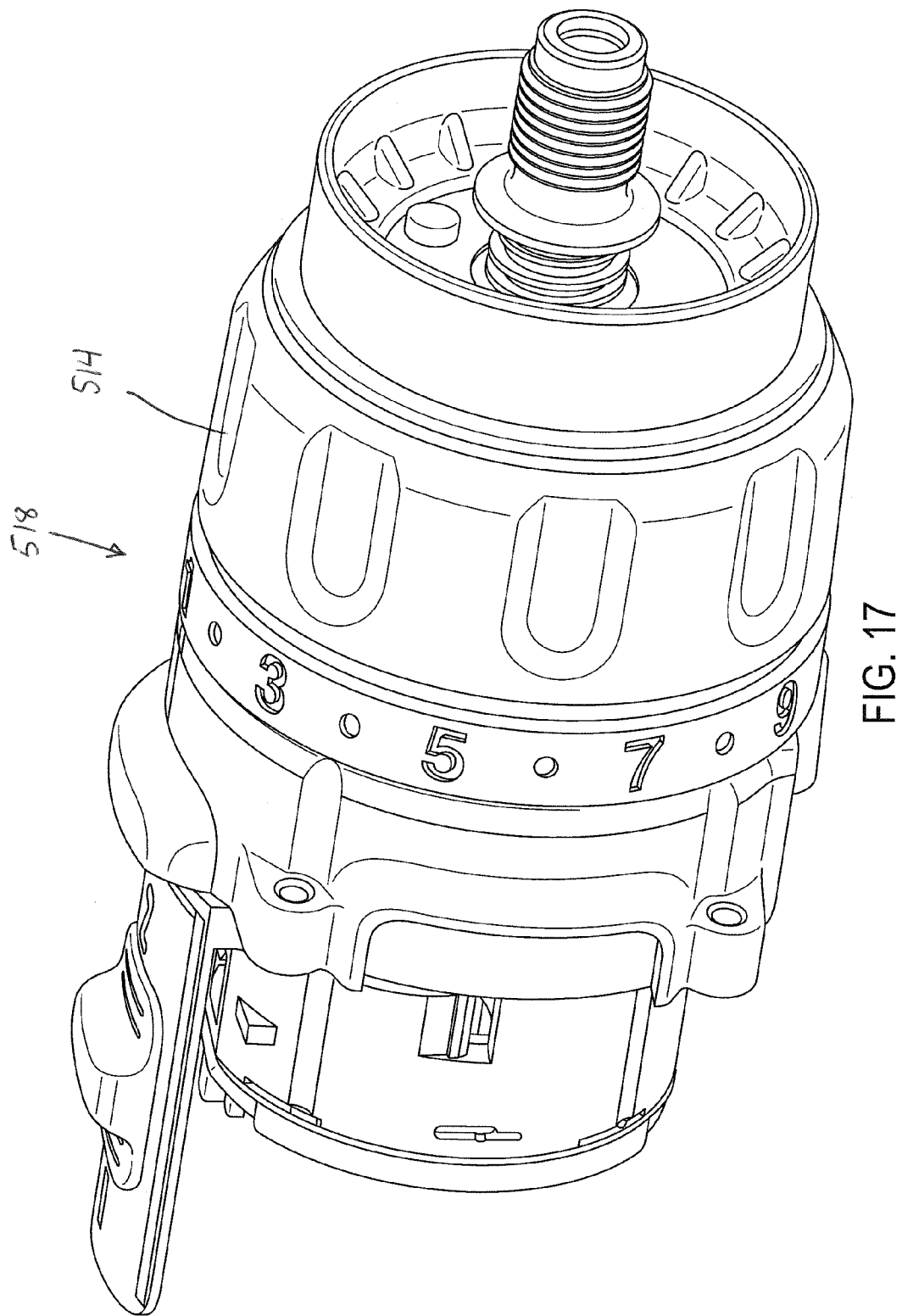
FIG. 17 is a perspective view another embodiment of a clutch mechanism.
Figure 18:
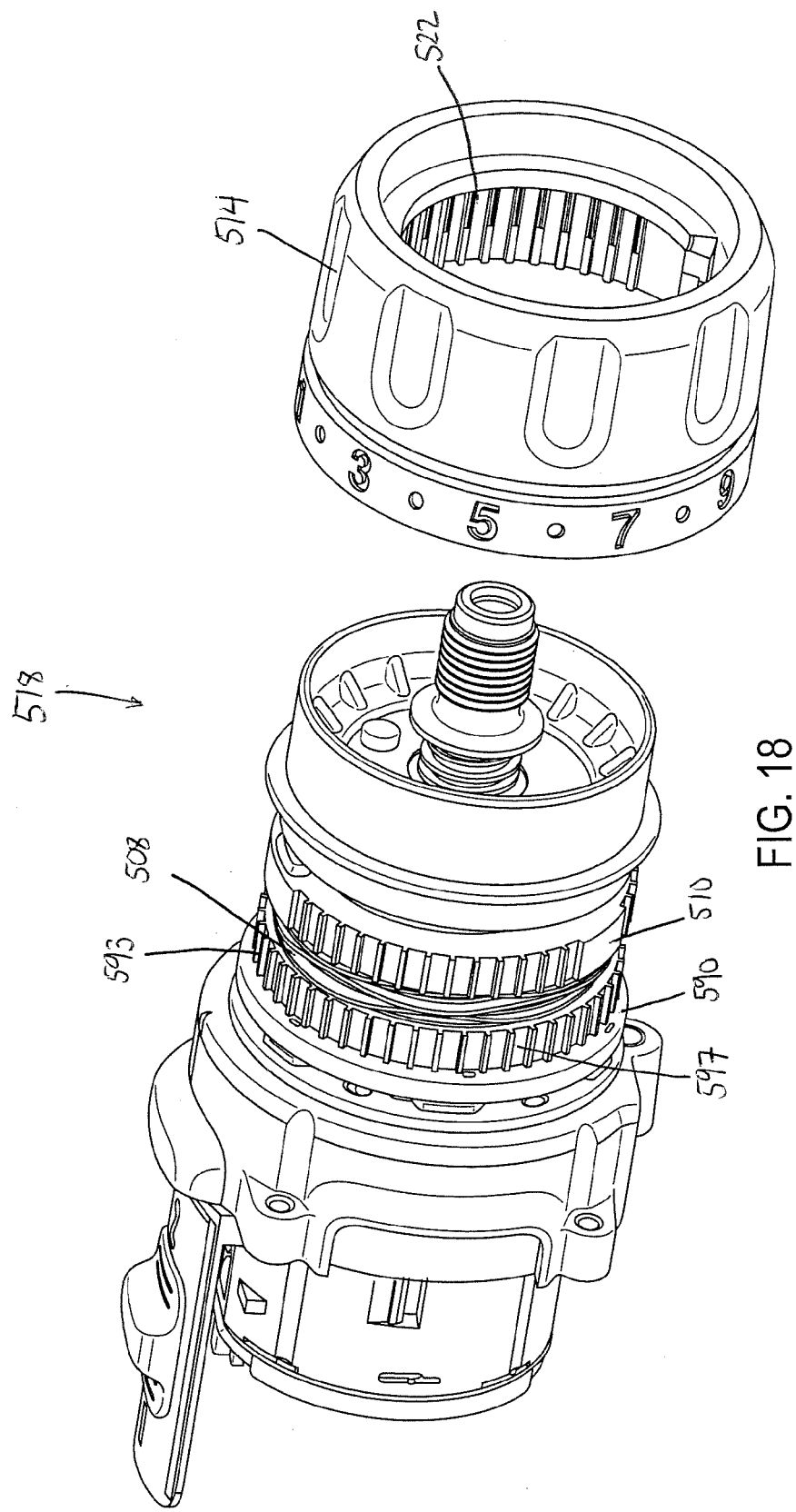
FIG. 18 is an exploded perspective view of the clutch mechanism of FIG. 17.
Figure 19:
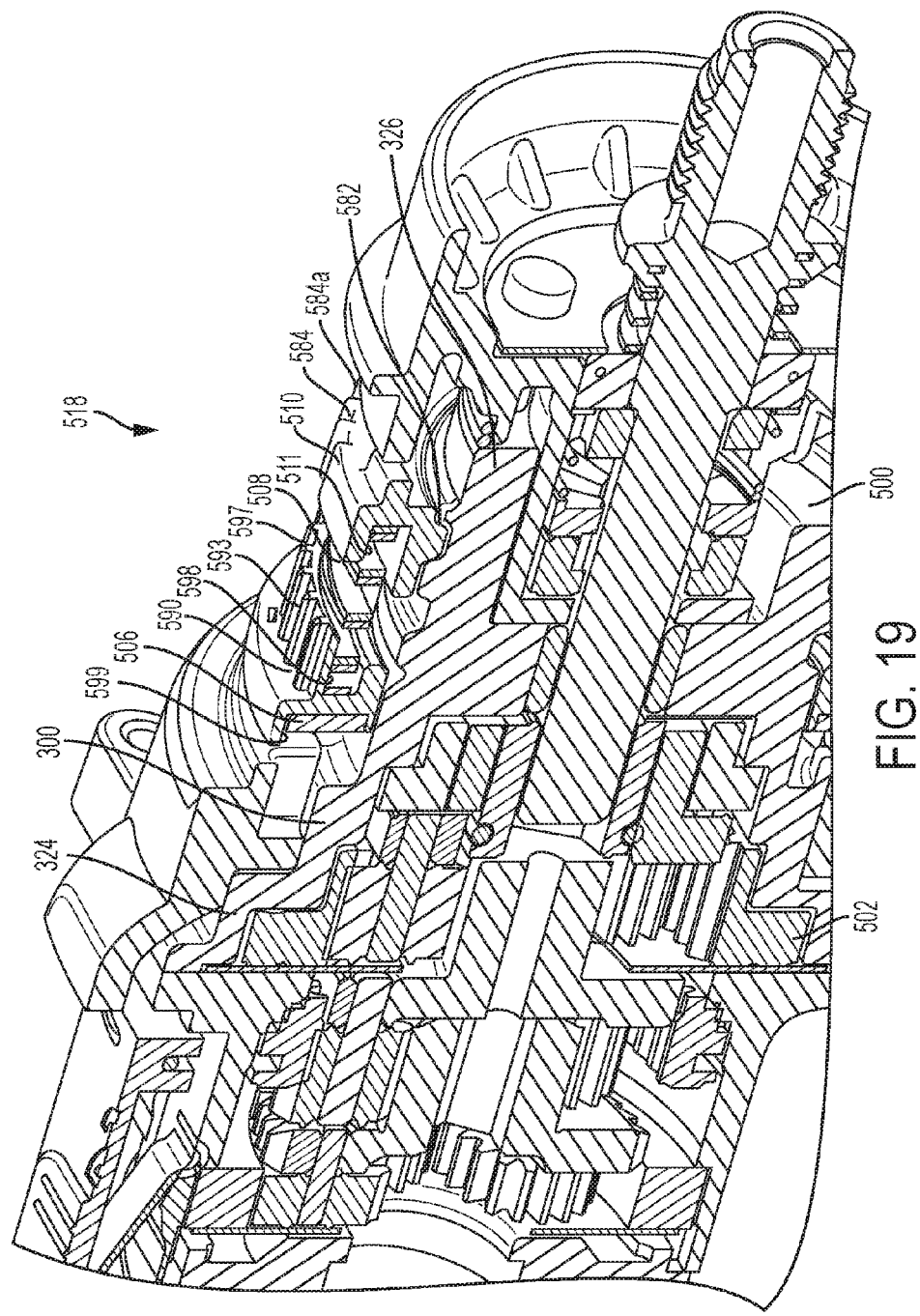
FIG. 19 is a cross-sectional view of the clutch mechanism of FIG. 17.
Figure 20:
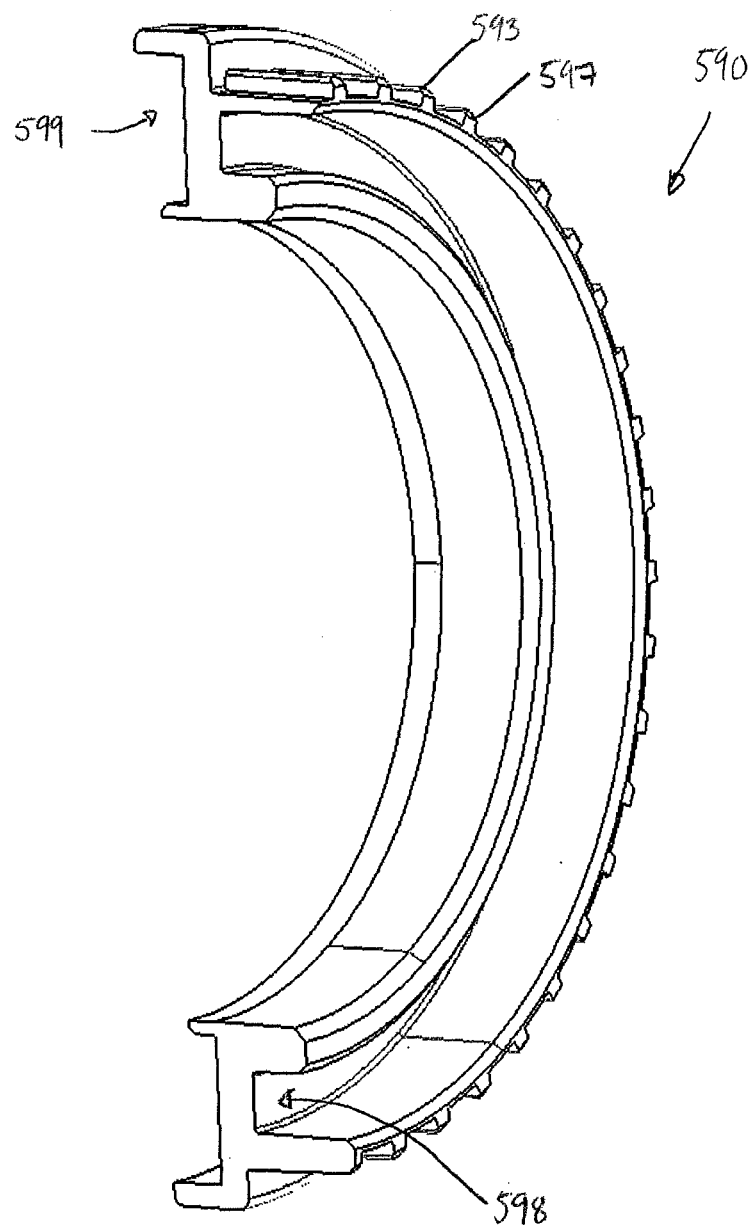
FIG. 20 is a perspective view, partially in section, of the spring retainer of the clutch mechanism of FIG. 17.

Returning to FIG. 3 and with additional reference to FIG. 15, the spring 308 is illustrated to be a conventional compression spring having ground ends. The spring 308 is disposed over the nose portion 326 of the clutch housing 300 between the adjustment ring 310 and the spring retainer 390. The adjustment ring 310 is an annular structure that is illustrated to include an internal annular flange 380, a threaded portion 382 and an engagement portion 384. The internal annular flange 380 extends around the inner circumference of the adjustment ring 310 and sized somewhat smaller in diameter than the spring 308 but larger than the nose portion 326 of the clutch housing 300. The threaded portion 382 intersects the internal annular flange 380 and is sized to threadably engage the thread form 330 that is formed on the outer diameter of the nose portion 326. The spring 308 is received inside of the engagement portion 384 and abuts against the flange 380. The engagement portion 384 is configured to permit the adjustment ring 310 to be rotatably coupled to the clutch adjustment sleeve 314 and well as to move axially within the clutch adjustment sleeve 314. In the example provided, the engagement portion 384 includes a plurality of engagement teeth 384a that are formed about the outer perimeter of the adjustment ring 310. The engagement teeth 384a will be described in further detail, below.

Figure 4:
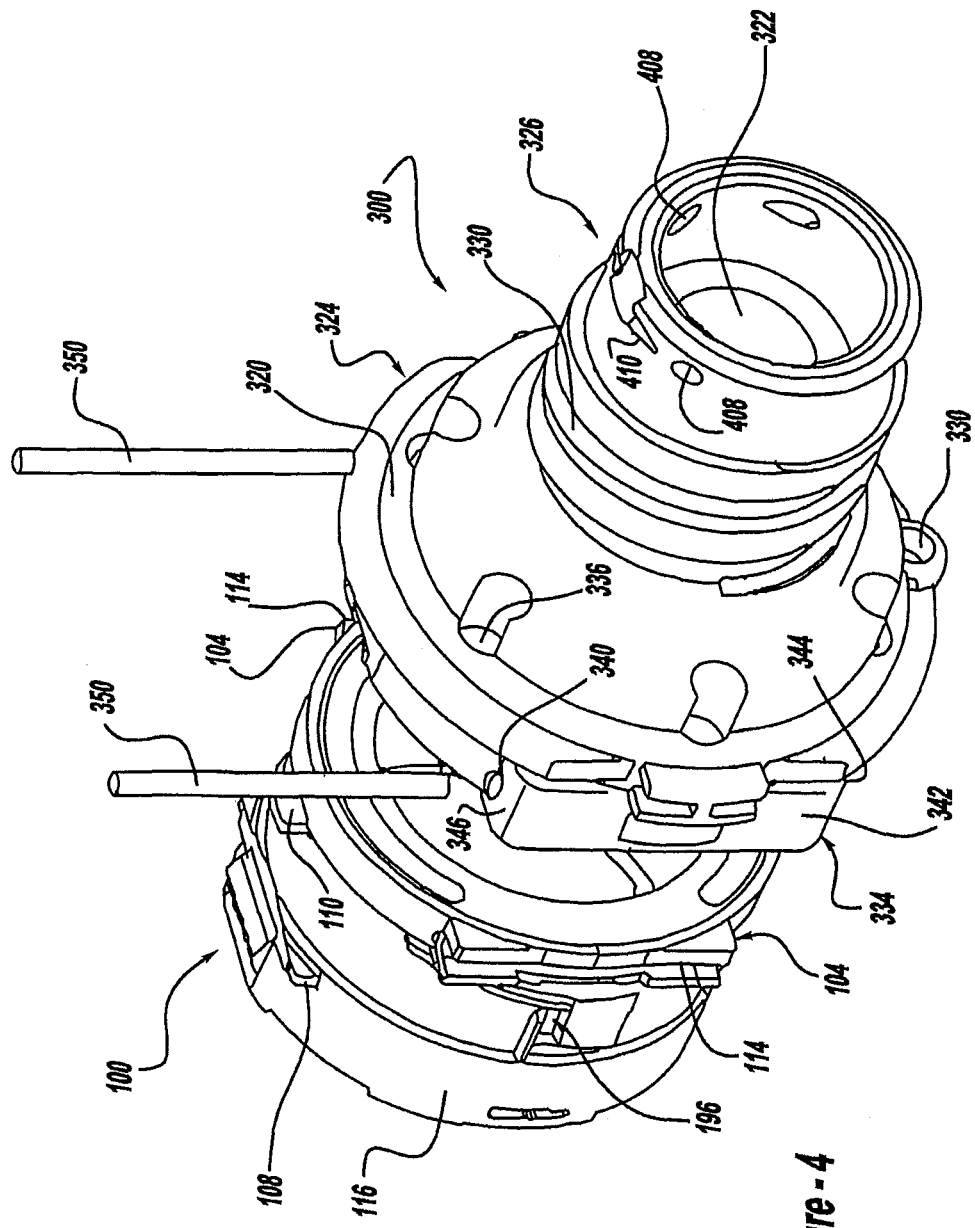
FIG. 4 is an exploded perspective view of a portion of the power tool of FIG. 1 illustrating the construction of the gear case and the clutch adjustment sleeve.

A wire clip 400 is coupled to the nose portion 326 to inhibit the removal of the adjustment ring 310 from the thread form 330. The wire clip 400 is formed in U-shape, having a base 402 that is disposed between a pair of spaced apart legs 404. Each of the legs 404 extends in a generally perpendicular direction away from the base 402. With the clutch plate 306 and spring 308 fitted over the nose portion 326 and the adjustment ring 310 engaged to the thread form 330, the wire clip 400 is fitted over the nose portion 326 generally perpendicular to the longitudinal axis of the clutch housing 300 such that legs 404 are engaged to leg apertures 408 in the clutch housing 300 and the base 402 is disposed in a shallow U-shaped recess 410 that is situated on the top surface of the nose portion 326 as best shown in FIG. 4. Engagement of the wire clip 400 into the leg apertures 408 and recess 410 operatively locks the wire clip 400 to the nose portion 326 and thereby creates a positive stop that is configured to prevent the adjustment ring 310 from being threaded out of engagement with the thread form 330 that is formed onto the nose portion 326.

Referring to FIGS. 3 and 15-16B, the spring retainer 390 has an annular shaped body with a front annular portion 391A having an outer wall 393 with an outer diameter D1, and an inner wall 394 with an diameter D2. The spring retainer 390 also has a rear annular portion 391B sharing the outer wall 393 with the same outer diameter D1, and an inner wall 395 with an inner diameter D3 that is smaller than the inner diameter D2. Joining the inner walls 394, 395 is an annular shoulder 396. The inner wall 394 and the shoulder 396 together form a recess 392 that receives the spring 308. The outer wall 393 has a plurality of splines 397 configured to engage the engagement teeth 422 on the clutch adjustment sleeve 314, as described below. The inner walls fit loosely over the clutch housing and enable the spring retainer 390 to rotate and move axially relative to the clutch body.

The clutch adjustment sleeve 314 is constructed in the form of a hollow sleeve that shrouds the clutch plate 306, the spring 308, the nose portion 326 and the wire clip 400. The clutch adjustment sleeve 314 extends forwardly of the base portion 324 and includes a gripping surface 420 that is formed on its outer perimeter. The gripping surface 420 is contoured to permit the user of the power tool 10 to rotate the clutch adjustment sleeve 314 about the longitudinal axis of the power tool 10 to adjust the setting of the clutch mechanism 18 as will be discussed in greater detail, below.

A plurality of mating engagement teeth 422 are formed onto the inner diameter of the clutch adjustment sleeve 314 which are sized to engage the engagement teeth 384a of the adjustment ring 310 and the splines 397 of the spring retainer 390. The mating engagement teeth 422 are relatively longer than the engagement teeth 384a and splines 397 combined, and as such, permit the engagement teeth 384a and splines 397 to axially slide along the mating engagement teeth 422 along the longitudinal axis of the power tool 10 when the clutch adjustment sleeve 314 is rotated. In addition, the engagement between the engagement teeth 422 of the clutch sleeve 314 and the engagement teeth 384a and the splines 397 cause the clutch sleeve 314, the adjustment ring 310, and the spring retainer 390 to rotate together, substantially in unison.

Rotation of the clutch adjustment sleeve 314 relative to the clutch housing 300 causes the adjustment ring 310 and the spring retainer 390 to rotate about the clutch housing 300. The spring retainer 390 remains substantially stationary axially relative to the clutch housing 300 when it is rotated. The adjustment ring 310 ring moves axially relative to the clutch housing 300 when it is rotated, due to the engagement of the threaded portion 384 with the thread 330 on the clutch housing 300. The axial movement of the adjustment ring 310 alters the amount by which the spring 308 is compressed between the adjustment ring 310 and the spring retainer 390. Because the adjustment ring 310 and the spring retainer 390 tend to rotate together in unison, the spring 308 tends not to become twisted as the adjustment ring 310 and spring retainer 390 rotate.

When the power tool 10 is operated and the torque that is exerted through the gear teeth 202a of the third ring gear 202 does not exceed the holding force exerted by the spring 308 and balls 304 on the clutch face 22 of the third ring gear 202, the third ring gear 202 remains rotationally fixed relative to the housing. When this happens, the third sun gear 200 causes the third set of planet gears 206 to rotate on their axes and orbit the sun gear 200. The orbiting of the third set of planet gears 206 causes the third reduction carrier 204 to rotate and transmit torque to the output spindle assembly 20.

When the power tool 10 is operated and the torque that is exerted through the gear teeth 202a of the third ring gear 202 exceeds the holding force exerted by the spring 308 and balls 304 on the clutch face, the peaks 224 of the clutch face 222 ride over the balls 304 to enable the third ring gear 202 to rotate relative to the housing. When this happens, the third sun gear 200 causes the third set of planet gears 206 to rotate on their axes but not to oribit the sun gear 200 in any substantial manner. Thus, the third reduction carrier 204 substantially stops rotating, and torque transmission to the output spindle assembly 20 is greatly reduced and/or essentially interrupted.

In the example provided, the detent mechanism 312 is illustrated to include a detent spring 430, a plunger 432 and a detent ring 434. The detent spring 430 and plunger 432 are housed in the detent aperture 338 that is formed through the base portion 324 of the clutch housing 300. The detent spring 430, which is illustrated to be a conventional compression spring, abuts the gear case 100 on a first side and a flattened end of the plunger 432 on the opposite side, thereby biasing the plunger 432 in a direction outwardly from the base portion 324. The plunger 432 includes a contact end 440, which is defined by a spherical radius in the example illustrated, and which is biased forwardly by the detent spring 430 into contact with the detent ring 434. In the particular embodiment provided, the detent ring 434 is integrally formed with the clutch adjustment sleeve 314 and includes a plurality of circumferentially spaced recesses or detents 442 that are sized to engage the contact end 440 of the plunger 432. Each of the detents 442 is illustrated to be defined by a spherical radius that conforms to the contact end 440. A setting indicator 450 (FIG. 2) may be employed to indicate the position of the adjustment ring 310 relative to the clutch housing 300. In the example provided, the setting indicator 450 includes an arrow 452 that is formed into the handle shells 34 and a scale 454 that is marked into the circumference of the clutch adjustment sleeve 314.

Interaction between the contact end 440 of the plunger 432 and the detents 442 in the detent ring 434 provide the user of the power tool 10 with feedback as to the setting of the clutch mechanism 18, as well as inhibit the clutch adjustment sleeve 314 from inadvertently rotating out of the position to which it has been set. The spring 308 exerts a compression force onto the annular flange 380 of the adjustment ring 310 and on the spring retainer 390, which in turn exerts a compression force on the plate member 360 of the clutch plate 306, driving the leg members 362 of the clutch plate 306 rearwardly and biasing the balls 304 into engagement with the clutch face 222. The balls 304 exert a counter torque onto the clutch face 222 that tends to inhibit rotation of the third ring gear 202 relative to the clutch housing 300.

Clutch Mechanism—Second Embodiment

Referring to FIGS. 17-20, in another embodiment a clutch mechanism 518 is illustrated to include a clutch housing 500, a clutch member or output ring gear 502, a plurality of locking members (e.g., balls or pins (not shown)), a clutch plate 506, a spring retainer 590, a spring 508, an adjustment ring 510, and a clutch adjustment sleeve 514, similar to the clutch housing 300, the clutch member 302, the locking members 304, the clutch plate 306, the spring retainer 390, the spring 308, the adjustment ring 310, and the clutch adjustment sleeve 314, described above with respect to the first embodiment of the clutch mechanism 18. The spring 508 differs from the spring 308 described above in that the spring 508 is a wave spring. The adjustment ring 510 differs from the adjustment ring 310 described above in that the adjustment ring 510 includes a rear annular recess 511 formed by walls having a C-shaped cross-section, providing a recess for receiving a front end of the wave spring 508. Like the adjustment ring 310, the adjustment ring 510 has an interior threaded portion 582 that threadably engages a thread 530 on the outer diameter of the nose portion 526, and outer an outer engagement portion 584 with a plurality of engagement teeth 584a that engage engagement teeth 522 on the inner diameter of the clutch adjustment sleeve 514.

The spring retainer 590 differs from the spring retainer 390 in that it has a front annular recess 598 formed by walls having a C-shaped cross-section to provide a first recess for receiving the rear end of the wave spring 508. The spring retainer 590 also has a rear annular recess 599 formed by additional walls having a C-shaped cross-section to provide second recess for receiving the clutch plate 506. Like the spring retainer 390, the spring retainer 590 has an outer wall 593 with a plurality of splines 597 configured to also engage the engagement teeth 522 on the clutch adjustment sleeve 514. The inner wall of the spring retainer 590 fits loosely over the clutch housing 500 and enables the spring retainer 590 to rotate and move axially relative to the clutch body.

The mating engagement teeth 522 are relatively longer than the engagement teeth 584a and splines 597 and as such, permit the engagement teeth 584a and splines 597 to axially slide along the mating engagement teeth 522 along the longitudinal axis when the clutch adjustment sleeve 514 is rotated. In addition, the engagement between the engagement teeth 522 of the clutch sleeve 514 and the engagement teeth 584a and the splines 597 cause the adjustment ring 510 and the spring retainer 590 to rotate together as a unit.

Rotation of the clutch adjustment sleeve 514 relative to the clutch housing 500 causes the adjustment ring 510 and the spring retainer 590 to rotate about the clutch housing 500. The spring retainer 590 remains substantially stationary axially relative to the clutch housing 500 when it is rotated. The adjustment ring 510 ring moves axially relative to the clutch housing 500 when it is rotated, due to the engagement of its threaded portion with the thread on the clutch housing 500. The axial movement of the adjustment ring 510 alters the amount by which the spring 508 is compressed between the adjustment ring 510 and the spring retainer 590. Because the adjustment ring 510 and the spring retainer 590 tend to rotate together in unison, the spring 508 tends not to become twisted as the adjustment ring 510 and spring retainer 590 rotate.

When the power tool is operated, and the output torque does not exceed the holding force of the spring 508 and the locking members against the clutch face on the ring gear, torque is transmitted to the output spindle in the manner described above. When the output torque exceeds the holding force of the spring 508 and the locking members against the clutch face on the ring gear, torque transmission to the output spindle is substantially reduced and/or effectively interrupted, in the manner described above.

Numerous modifications may be made to the exemplary implementations described above. For example, the spring retainer could be made integral with the clutch plate. The clutch mechanism may be used with other types of clutch springs such as disc springs. The adjustment ring may be threaded to the clutch adjustment sleeve instead of to the clutch housing. These and other implementations are within the scope of the following claims.

What is claimed is:

1. A power tool comprising:
a housing;
a motor disposed in the housing;
an output spindle received at least partially in the housing;
a transmission disposed in the housing and configured to selectively transmit torque from the motor to the output spindle;
a clutch assembly disposed between the transmission and the output spindle, the clutch assembly including
a clutch adjustment ring configured to move axially relative to the housing while being rotated relative to the housing,
a spring retainer disposed axially rearward of the clutch adjustment ring, the spring retainer coupled for rotation together with the clutch adjustment ring and configured to remain substantially axially stationary relative to the housing when rotated;
a spring disposed between the clutch adjustment ring and the spring retainer;
a clutch face coupled to a portion of the transmission;
a locking member disposed between the spring retainer and the clutch face, the locking member configured to transfer a holding force exerted by the spring to the clutch face,
wherein rotation and axial movement of the clutch adjustment ring alters the holding force of the spring to select a clutch setting among a plurality of different clutch settings such that, for each clutch setting, when an output torque exceeds the holding force, torque transmission from the transmission to the output shaft is effectively interrupted.

2. The power tool of claim 1, wherein the clutch assembly further comprises a clutch housing having rearward base portion configured to receive the clutch face, and a nose portion configured to receive at least a portion of the output spindle.

3. The power tool of claim 2, wherein the nose portion includes an externally threaded portion, and the clutch adjustment ring is internally threaded over the externally threaded portion.

4. The power tool of claim 3, wherein the spring retainer is internally unthreaded and received over the nose portion.

5. The power tool of claim 1, further comprising a clutch adjustment sleeve non-rotatably coupled to the clutch adjustment ring to the spring retainer, such that rotation of the clutch adjustment sleeve causes rotation of the clutch adjustment ring and the spring retainer.

6. The power tool of claim 1, wherein the clutch adjustment ring has a first recess that receives a first end of the spring and the spring retainer has a second recess that receives a second end of the spring.

7. The power tool of claim 1, wherein the spring comprises one of a compression spring and a wave spring.

8. The power tool of claim 1, wherein the clutch assembly further comprises a clutch plate disposed between the spring retainer and the locking member, the clutch plate transferring the holding force from the spring retainer to the locking member.

9. The power tool of claim 1, wherein the locking member comprises at least one of a ball and a pin, the clutch face comprises a ramped surface, and torque transmission from the transmission to the output shaft is effectively interrupted when the output torque causes the locking member rides over the ramped surface.

10. The power tool of claim 1, wherein the transmission comprises a planetary gear set having at least one ring gear and the clutch face is connected to the at least one ring gear, such that torque transmission is effectively interrupted when the ring gear is permitted to rotate relative to the housing.

11. A clutch assembly for a power tool having a housing, a transmission and an output spindle, the clutch assembly comprising:
a clutch adjustment ring configured to move axially relative to the housing while being rotated relative to the housing;
a spring retainer disposed axially rearward of the clutch adjustment ring, the spring retainer coupled for rotation together with the clutch adjustment ring and configured to remain substantially axially stationary relative to the housing when rotated;
a spring disposed between the clutch adjustment ring and the spring retainer;
a clutch face coupled to a portion of the transmission;
a locking member disposed between the spring retainer and the clutch face, the locking member configured to transfer a holding force exerted by the spring to the clutch face,
wherein rotation and axial movement of the clutch adjustment ring alters the holding force exerted by the spring to select a clutch setting among a plurality of different clutch settings such that, for each clutch setting, when an amount of output torque exceeds the holding force, torque transmission from the transmission to the output shaft is effectively interrupted.

12. The clutch assembly of claim 11, further comprising a clutch housing that includes a rearward base portion configured to receive the clutch face, and a nose portion configured to receive at least a portion of the output spindle.

13. The clutch assembly of claim 12, wherein the nose portion has an externally threaded portion, and the clutch adjustment ring is internally threaded over the externally threaded portion.

14. The clutch assembly of claim 13, wherein the spring retainer is internally unthreaded and received over the nose portion.

15. The clutch assembly of claim 11, further comprising a clutch adjustment sleeve non-rotatably coupled to the clutch adjustment ring and to the spring retainer, such that rotation of the clutch adjustment sleeve causes rotation of the clutch adjustment ring and the spring retainer.

16. The clutch assembly of claim 11 wherein the clutch adjustment ring has a first recess that receives a first end of the spring, and the spring retainer has a second recess that receives a second end of the spring.

17. The clutch assembly of claim 11, wherein the spring comprises one of a compression spring and a wave spring.

18. The clutch assembly of claim 11, further comprising a clutch plate disposed between the spring retainer and the locking member, the clutch plate transferring the holding force from the spring retainer to the locking member.

19. The clutch assembly of claim 11, wherein the locking member comprises at least one of a ball and a pin, and the clutch face comprises a ramped surface, wherein the locking member comprises at least one of a ball and a pin, the clutch face comprises a ramped surface, and torque transmission from the transmission to the output shaft is effectively interrupted when the output torque causes the locking member rides over the ramped surface.

20. A power tool comprising:
a housing;
a motor disposed in the housing;
an output spindle received at least partially in the housing;
a planetary gear transmission disposed in the housing and configured to selectively transmit torque from the motor to the output spindle, the planetary gear transmission having;
an input sun gear,
a planet gear meshed with the input sun gear,
an output carrier carrying the planet gear and configured to transmit output torque to the output spindle when the output carrier rotates, and
a ring gear meshed with the planet gear, and
a clutch assembly disposed between the planetary gear transmission and the output spindle, the clutch assembly including:
a clutch housing having a rearward base portion, and a nose portion having an externally threaded portion,
an internally threaded clutch adjustment ring received over the externally threaded portion of the clutch housing and configured to move axially relative to the clutch housing when being rotated relative to the clutch housing,
a non-internally threaded spring retainer disposed axially rearward of the clutch adjustment ring over the nose portion, the spring retainer configured to rotate relative to the clutch housing while remaining substantially axially stationary,
an external clutch adjustment sleeve received over and non-rotatable coupled to the clutch adjustment ring and the spring retainer such that rotation of the clutch adjustment sleeve causes rotation of the clutch adjustment ring and the spring retainer,
a spring disposed between the clutch adjustment ring and the spring retainer,
a clutch face fixedly coupled to a portion of the ring gear;
a locking member disposed between the spring retainer and the clutch face, the locking member configured to transfer a holding three exerted by the spring to the clutch face,
wherein:
rotation and axial movement of the clutch adjustment ring alters the holding force exerted by the spring to select a clutch setting among a plurality of different clutch settings such that, for each clutch setting,
when an output torque does not exceed the holding force, the locking member retains the ring gear from rotating relative to the housing, which causes the sun gear to cause the planet gears to orbit the sun gear, which causes the output carrier to rotate and transmit torque to the output spindle, and
when the output torque exceeds the holding force, the locking members allow the ring gear to rotate relative to the housing, which causes the sun gear to allow the planet gears to rotate without orbiting the sun gear, which causes the output carrier to remain substantially stationary and effectively interrupts torque transmission to the output spindle.

21. A power tool comprising:
a housing;
a motor disposed in the housing;
a transmission disposed in the housing and configured to transmit torque from the motor to an output spindle;
a clutch assembly coupled to the transmission, the clutch assembly including
  a clutch housing having a rearward base portion, and a nose portion having an externally threaded portion,
  an internally threaded clutch adjustment ring received over the externally threaded portion of the nose portion in order to move axially relative to the nose portion while being rotated,
  a spring retainer disposed axially rearward of the clutch adjustment ring, the spring retainer coupled for rotation together with the clutch adjustment ring;
  a spring disposed between the clutch adjustment ring and the spring retainer;
  a clutch face coupled to a portion of the transmission;
  a locking member disposed between the spring retainer and the clutch face, the locking member configured to transfer a holding force exerted by the spring against the spring retainer to the clutch face,
  wherein rotation of the clutch adjustment ring alters the holding force of the spring to select a clutch setting among a plurality of different clutch, settings such that, for each clutch setting, when an output torque exceeds the holding force, torque transmission from the transmission to the output spindle is effectively interrupted.

22. The power tool of claim 21, wherein the spring retainer is internally unthreaded and received over the nose portion.

23. The power tool of claim 21, further comprising an external clutch adjustment sleeve non-rotatably coupled to the clutch adjustment ring, such that rotation of the clutch adjustment sleeve causes rotation of the clutch adjustment ring and the spring retainer.

24. The power tool of claim 21, wherein the clutch adjustment ring has a first retaining portion that retains a first end of the spring.

25. The power tool of claim 24, wherein the first retaining portion comprises a recess.

26. The power tool of claim 24, wherein the spring retainer has a second retaining portion that retains a second end of the spring.

27. The power tool of claim 21, wherein the spring comprises a compression spring.

28. The power tool of claim 21, Wherein the locking member comprises at least one of a ball and a pin, the clutch face comprises a ramped surface, and torque transmission from the transmission to the output shaft is effectively interrupted when the output torque causes the locking member to ride over the ramped surface.

29. The power tool of claim 21, wherein the transmission comprises a planetary gear set having at least one ring gear and the clutch face is coupled to the at least one ring gear, such that torque transmission is effectively interrupted when the ring gear is permitted to rotate relative to the housing.

* * * * *